US010929038B1

(12) United States Patent
Wang et al.

(10) Patent No.: US 10,929,038 B1
(45) Date of Patent: Feb. 23, 2021

(54) FACILITATING A SMART WATCH LIST WITH LIMITED RESOURCES IN STORAGE SYSTEMS

(71) Applicant: EMC IP Holding Company LLC, Hopkinton, MA (US)

(72) Inventors: Meng Wang, Shanghai (CN); Jignesh Bhadaliya, Irvine, CA (US); Min Gong, Shanghai (CN); Xin Wu, Shanghai (CN); Minglong Sun, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/731,335

(22) Filed: Dec. 31, 2019

(51) Int. Cl.
*G06F 3/06* (2006.01)
*G06F 9/48* (2006.01)
*G06F 9/38* (2018.01)
*G06F 9/50* (2006.01)

(52) U.S. Cl.
CPC .......... *G06F 3/0635* (2013.01); *G06F 3/0604* (2013.01); *G06F 3/0611* (2013.01); *G06F 3/0653* (2013.01); *G06F 3/0673* (2013.01); *G06F 9/3851* (2013.01); *G06F 9/485* (2013.01); *G06F 9/4881* (2013.01); *G06F 9/5094* (2013.01)

(58) Field of Classification Search
CPC .... G06F 3/0635; G06F 3/0604; G06F 3/0611; G06F 3/0653; G06F 3/0673; G06F 9/3851; G06F 9/485; G06F 9/4881; G06F 9/5094

USPC .......................................................... 710/38
See application file for complete search history.

(56) References Cited

U.S. PATENT DOCUMENTS

| 3,702,006 A * | 10/1972 | Page ................... G06F 11/3485 718/105 |
| 5,815,492 A * | 9/1998 | Berthaud ............ H04L 12/5602 370/234 |
| 10,248,316 B1 * | 4/2019 | van Rotterdam ..... G06F 3/0685 |
| 2002/0091746 A1 * | 7/2002 | Umberger ............. G06F 3/0659 718/105 |

(Continued)

OTHER PUBLICATIONS

Wikipedia "Dell EMC Isilon" web accessed on Mar. 25, 2020 from web address: https://en.wikipedia.org/wiki/Dell_EMC_Isilon.

(Continued)

*Primary Examiner* — Paul R. Myers
(74) *Attorney, Agent, or Firm* — Amin, Turocy & Watson, LLP

(57) ABSTRACT

Facilitating a smart watch list in storage systems is provided herein. A system can comprise a processor and a memory that stores executable instructions that, when executed by the processor, facilitate performance of operations comprising determining a first priority of a first path of a storage system and a second priority of a second path of the storage system. The operations also can comprise moving the first path to a monitor status and the second path to a wait status based on the first priority of the first path being a higher priority than the second priority of the second path and based on a limitation of a number of paths that are able to be in the monitor status at a same time. Further, the operations can comprise outputting respective information indicative of the first priority, the second priority, the monitor status, and the wait status.

20 Claims, 13 Drawing Sheets

(56) References Cited

U.S. PATENT DOCUMENTS

2003/0177176 A1\* 9/2003 Hirschfeld ............ H04L 69/329
                                                            709/203
2005/0210321 A1\* 9/2005 Bai ....................... G06F 3/0613
                                                            714/13
2020/0104180 A1\* 4/2020 Banerjee ............... G06F 9/4881

OTHER PUBLICATIONS

Wikipedia "Finite-state machine" web accessed on Mar. 25, 2020 from web address: https://www.wikiwand.com/en/Finite-state_machine.

\* cited by examiner

FACILITATING A SMART WATCH LIST WITH LIMITED RESOURCES IN STORAGE SYSTEMS

TECHNICAL FIELD

The subject disclosure relates generally to data storage and communications. More specifically, the subject disclosure relates to monitoring paths and related performance of such systems.

BACKGROUND

In the storage system region, monitoring the system can be important. For example, some files can be considered "hot" files, which can include data that is accessed frequently. In some cases, the data in the hot files needs to be accessed quickly and, therefore, should reside on the fastest storage available (e.g., flash, hybrid or tiered storage environment). Through monitoring of a storage system, hot accessed files can be moved to a higher tier and/or the reason why such files are hot accessed files can be determined and one or more actions taken with respect to the files. However, traditional monitoring functions cannot monitor the system in its entirety. Instead, only portions of the system can be monitored, while other portions are not monitored.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a method that can comprise defining, by a system comprising a processor, a priority function based on a first input related to respective consumptions of input resources or output resources and a second input related to respective wait times of paths of a group of paths in a storage system. The method also can comprise determining, by the system, respective priorities of the paths of the group of paths identified as targets for monitoring based on the priority function and moving, by the system, a path of the group of paths into a monitor status based on a priority of the path being determined to be above a defined threshold value. Further, the method can comprise outputting, by the system, information indicative of the respective priorities and respective monitor statuses, comprising the monitor status of the path of the group of paths.

In an example, the path is a first path, the priority is a first priority, and the defined threshold value is a first defined threshold value. Further to this example, the method can comprise determining, by the system, a second path that has a second priority determined to be lower than the first defined threshold value and at or above a second defined threshold value. The method also can comprise associating, by the system, an indication with the second path, wherein the indication identifies the second path as being in a waiting status. The waiting status can indicate an amount of time the second path has waited before being monitored. According to an implementation, the method also can comprise determining, by the system, a third path that has a third priority determined to be below the second defined threshold value and removing, by the system, the third path from the group of paths.

According to some implementations, the method can comprise, prior to moving the path into the monitor status, determining, by the system, at least two paths of the group of paths that comprise a same name. Further, the method can comprise merging, by the system, the at least two paths into a single path.

In some implementations, prior to determining the respective priorities, the method can comprise selecting, by the system, the group of paths as a subset of a plurality of paths in the storage system. Further to these implementations, selecting the group of paths can comprise executing, by the system, a top n command on the storage system. The top n command can identify one path from the group of paths that is consuming more resources as compared to consumption of other paths of the group of paths, excluding the one path, and wherein n is a positive integer.

Selecting the group of paths can comprise, according to some implementations, prior to determining the respective priorities, receiving, by the system, a request to monitor one or more paths of the storage system. Further, selecting the group of paths can comprise selecting, by the system, the group of paths as a subset of a plurality of paths in the storage system based, at least in part, on the request.

In accordance with some implementations, determining the respective priorities can comprise determining respective first priorities. Further to these implementations, the method can comprise generating, by the system, a list of paths being monitored, including the path and using, by the system, the list of paths as a third input related to the paths to be monitored. Further, the method can comprise determining, by the system, respective second priorities of the paths.

In some implementations, determining respective priorities of the paths of the group of paths can comprise determining the respective priorities of the paths based on a third input that comprises a limitation on a number of paths that are able to be monitored at a same time. Further, in some implementations, the priority of the path increases based on a first increase in a wait time or a second increase in a consumption of input resources or output resources.

Another embodiment relates to a system that can comprise a processor and a memory that stores executable instructions that, when executed by the processor, facilitate performance of operations. The operations can comprise determining a first priority of a first path of a storage system based on a first input related to a first wait time associated with the first path, and a second input related to a first consumption of input resources and output resources by the first path, and a second priority of a second path of the storage system based on a third input related to a second wait time associated with the second path, and a fourth input related to a second consumption of input resources and output resources by the second path. The operations also can comprise moving the first path to a monitor status and the second path to a wait status based on a determination that the first priority of the first path is a higher priority than the second priority of the second path and based on a limitation of a number of paths that are able to be in the monitor status at a same time. Further, the operations can comprise outputting respective information indicative of the first priority, the second priority, the monitor status, and the wait status.

In accordance with an implementation, the operations can comprise determining a third priority of a third path of the storage system based on a fifth input related to a third wait time associated with the third path and a sixth input related to a third consumption of input resources and output resources by the third path. Further, the operations can comprise determining the third path and the first path comprise a same name and merging the third path into the first path.

The operations also can comprise, according to some implementations, determining a third priority of a third path of the storage system based on a fifth input related to a third wait time associated with the third path and a sixth input related to a third consumption of input resources and output resources by the third path. Also, the operations can comprise removing the third path from consideration during the monitor status based on a second determination that the third priority does not satisfy a defined threshold value.

According to some implementations, the operations can comprise, prior to the determining the first priority and the second priority, selecting the first path and the second path from the storage system based on identification of first paths of the storage system that are consuming more resources than an amount of resources consumed by second paths of the storage system.

The operations can comprise, in some implementations, determining a third priority of the first path based on a fifth input related to a third wait time associated with the first path, and a sixth input related to a third consumption of input resources and output resources by the first path. A fourth priority of the second path can be determined based on a seventh input related to a fourth wait time associated with the second path, and an eighth input related to a fourth consumption of input resources and output resources by the second path. Further, the operations can comprise moving the second path to the monitor status and the first path to the wait status based on a second determination that the fourth priority of the second path is a higher priority than the third priority of the first path and based on the limitation of the number of paths that are able to be in the monitor status at the same time. The operations also can comprise outputting respective second information indicative of the third priority, the fourth priority, the monitor status, and the wait status.

In some implementations, prior to determining the first priority of the first path and the second priority of the second path, the operations can comprise receiving a request to include at least one of the first path and the second path in a monitoring process.

A further embodiment relates to a machine-readable storage medium, comprising executable instructions that, when executed by a processor, facilitate performance of operations. The operations can comprise selecting, for inclusion in a monitor watch list, a first path from a set of paths in a storage system and determining a first priority for the first path. Further the operations can comprise performing at least one of the following. Monitoring the first path in the monitor watch list based on the first priority being above a first defined priority level and based on a first determination that a number of paths being monitored does not satisfy a defined number of paths. Placing the first path in a pending status based on a second determination that the number of paths being monitored satisfies the defined number of paths. Removing the first path from inclusion in the monitor watch list based on the first priority being below a second defined priority level, wherein the first defined priority level is a higher priority than the second defined priority level.

In some implementations, the operations can comprise determining a second priority for the first path after a defined interval and performing at least one of the following. Monitoring, or continuing to monitor, the first path based on the second priority being above the first defined priority level and based on a third determination that the number of paths being monitored does not satisfy the defined number of paths. Placing, or retaining, the first path in the pending status based on a fourth determination that the number of paths being monitored satisfies the defined number of paths. Removing the first path from inclusion in the monitor watch list based on the second priority being below the second defined priority level.

In some implementations, selecting the first path can comprise receiving a request that the first path be included in the monitor watch list. According to some implementations, selecting the first path can comprise identifying the first path as consuming more resources as compared to other paths in the set of paths.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

When storage systems (e.g., data storage systems) are running for an extended amount of time, monitoring of the system can be important. For example, users of the system might want to see detailed statistics about the system. However, a full statistic generation job can be very heavy work for the processor. This can be especially true when the statistic is Input and/or Output (I/O) related, because performing the task can slow down the normal workflow. Traditionally, there are no existing I/O related systems that can show full detailed results to the users at a single time. Instead, such systems only render the top x results, which is not enough most of the time because the user want more details. For example, users want to see results in all folders (or the majority of the folders), in detail, to determine the root cause of the I/O performance drop down.

In an example, although all the results of a traditional system cannot be shown at one time, when investigating the problem, it was determined that there are at least two kinds of commands. A first command can show the top n I/O consumed paths in the system. A second command can dig into the path "top n" command to provide more detailed information, where n is a positive integer. However, in the traditional system, the whole system cannot be monitored with a detailed result. With the disclosed aspects, however, segmented time distribution can be utilized to obtain detailed results. Further, the disclosed aspects can traverse through the system (e.g., think about how a spotlight is moved around) and portions that are important can be determined. For example, the important portions can be determined based on one or more rules and/or one or more policies. Further, the important portions can be the portions determined to be important to a user (or multiple users).

The disclosed aspects can be used to monitor a storage system with limited system resources. By continually generating a watch list smartly, the critical path in the system can be monitored. The monitored results can be used to make a next decision related to the storage system.

Figure 1:
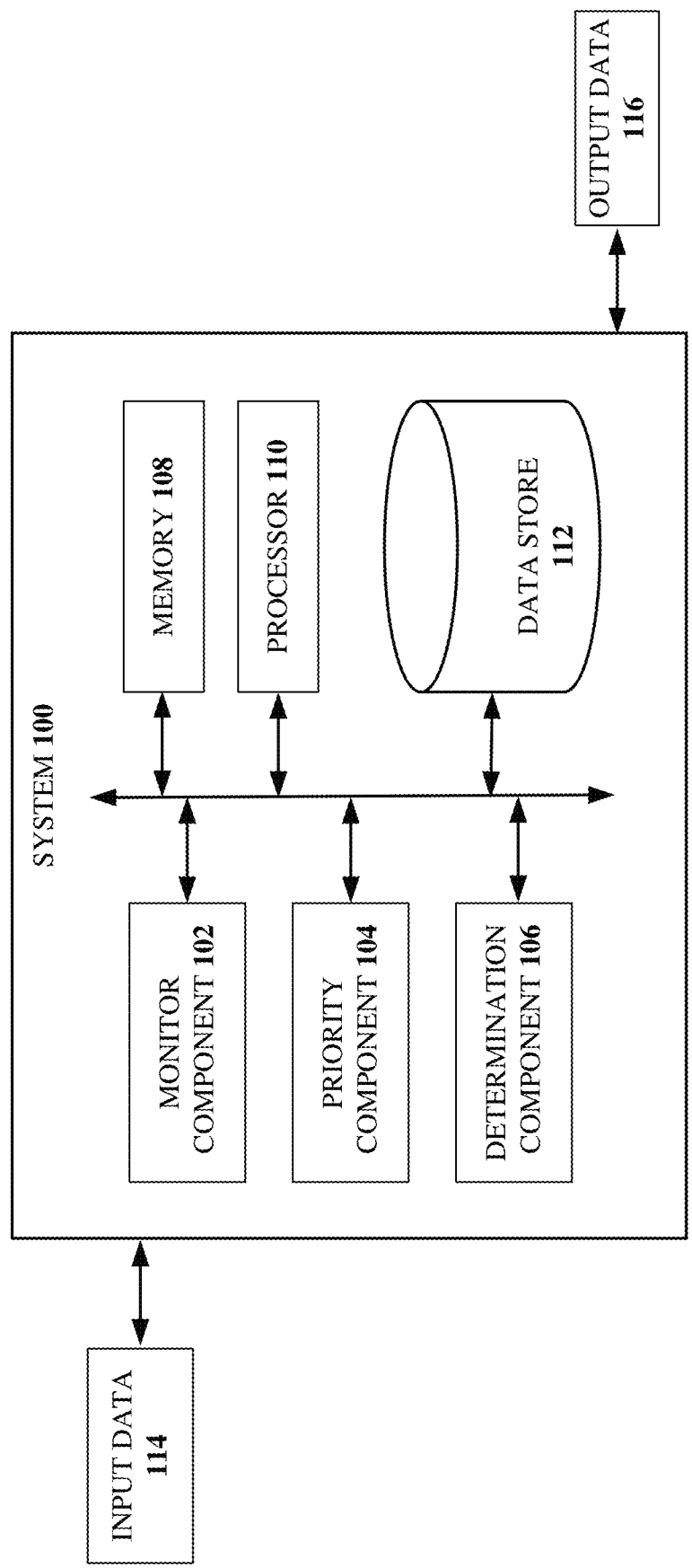
FIG. 1 illustrates a block diagram of an example, non-limiting, system for facilitating a smart watchlist with limited resources in accordance with one or more embodiments described herein.

With reference now to FIG. 1, illustrated is a block diagram of an example, non-limiting, system 100 for facilitating a smart watchlist with limited resources in accordance with one or more embodiments described herein. Aspects of systems (e.g., the system 100 and the like), apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system 100 (and the other embodiments described herein) can be utilized for creation of a watch list, which can, with limited resources, provide detailed results. Further, multiple types of filter triggers can be supported. For example, the system can handle multiple triggers at substantially the same time or simultaneously. In addition, provided is a decision system that can be utilized to determine what to watch in real time (and what does not need to be watched).

As illustrated, the system 100 can comprise a monitor component 102, a priority component 104, a determination component 106, at least one memory 108, at least one processor 110, and at least one data store 112. The system 100 can obtain, as input data 114, one or more triggers, which can be multiple types of triggers (e.g., filter trigger part). For example, the one or more triggers can include top n results, a critical path, user-assigned triggers, and so on. The system 100 can also obtain, as the input data 114, system limitations (e.g., system limitation part). The system limitations can include limitations from the system, to make the impact on the main system as small as possible, the commands associated with the input data 114 can run (e.g., can be executed) in a limited frequency and with limited paths.

Based on at least a portion of the input data 114, the monitor component 102 can take on input of which paths should be monitored. For example, the monitor component 102 can executed (e.g., run) the "top n" command on the system to determine if any new path is consuming a large amount of resources in the system. Additionally, or alternatively, the monitor component 102 can run commands to obtain detailed information about the paths being monitored. Based on the determination of which paths should be monitored, the monitor component 102 can generate a list of paths that should be monitored at a future time.

The priority component 104 can define a priority function. To define the priority function, the priority component 104 can evaluate one or more parameters. For example, a parameter can include information related to how critical this path consumed Input/Output (I/O), also referred to as the criticality. Another parameter can be how long this path waited before being monitored. For example, there can be a limitation on the number of paths that can be monitored at a single time (e.g., at a same time). Therefore, there can be some paths in a waiting status at any given time. The priority of the path can grow if the criticality increases or if the waiting time increases. The priority component 104 can determine the priority of each path. Further, paths with the same name (or with similar identifying features) can be merged. According to some implementations, the merge policy can be to retain the highest priority path and discard the other paths. Upon or after completion of this process, the priority component 104 can provide, as output data 116, a list of paths with updated priority.

Further, the determination component 106 can chose at least one process. For example, the determination component 106 can obtain the path list from the priority component 104 (e.g., as input). The determination component 106 can process the path list by sorting all the paths by priority. While performing the sorting, the determination component 106 can consider the system limitations. The paths with a high priority can be moved by the determination component 106 into monitoring status. Paths that cannot be moved to monitoring status, based on system limitations, can be indicated by the determination component 106 as being in a waiting status. In addition, the determination component 106 can remove the paths with very low priority. Removing the low priority paths can increase system efficiency.

Upon or after the determination component 106 has indicated the paths that should be monitored, those paths can be input back to the monitor component 102 (e.g., as the input data 114), as part of a feedback loop (e.g., a closed loop). Accordingly, the system 100 can continually (or continuously) run and generate useful results.

As discussed, herein, the system 100 can utilized limited resources while providing detailed results, which can be useful for next actions decisions. Further, the system 100 can use limited (e.g., very little) resources and the watch list can be generated in real time. The watch list can be generated repeatedly (in a feedback loop) to allow for continual (or continuous) monitoring and outputting of one or more results. Additionally, the system 100 can support multiples triggers allowing for input (as the input data 114) of more than just the "top n" results, but also some paths assigned to the watch list. The multiple types of input data can provide results that are useful and of more concern than other results, which can be ignored or not output.

The at least one memory 108 can be operatively connected to the at least one processor 110. The at least one memory 108 can store executable instructions and/or computer executable components (e.g., the monitor component 102, the priority component 104, the determination component 106, and so on) that, when executed by the at least one processor 110 can facilitate performance of operations. Further, the at least one processor 110 can be utilized to execute computer executable components (e.g., the monitor component 102, the priority component 104, the determination component 106, and so on) stored in the at least one memory 108.

For example, the at least one memory 108 can store protocols associated with facilitating a smart watch list with limited resources in storage systems (including cloud-based storage systems) as discussed herein. Further, the at least one memory 108 can facilitate action to control communication between the system 100 and other systems, one or more file storage systems, one or more user equipment devices, such that the system 100 employ stored protocols and/or algorithms to achieve improved watch lists of storage systems using as little resources as possible as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 110 can facilitate a smart watch list with limited resources in storage systems. The at least one processor 110 can be a processor dedicated to analyzing and/or generating information received, a processor that controls one or more components of the system 100, and/or a processor that both analyzes and generates information received and controls one or more components of the system 100.

Figure 2:
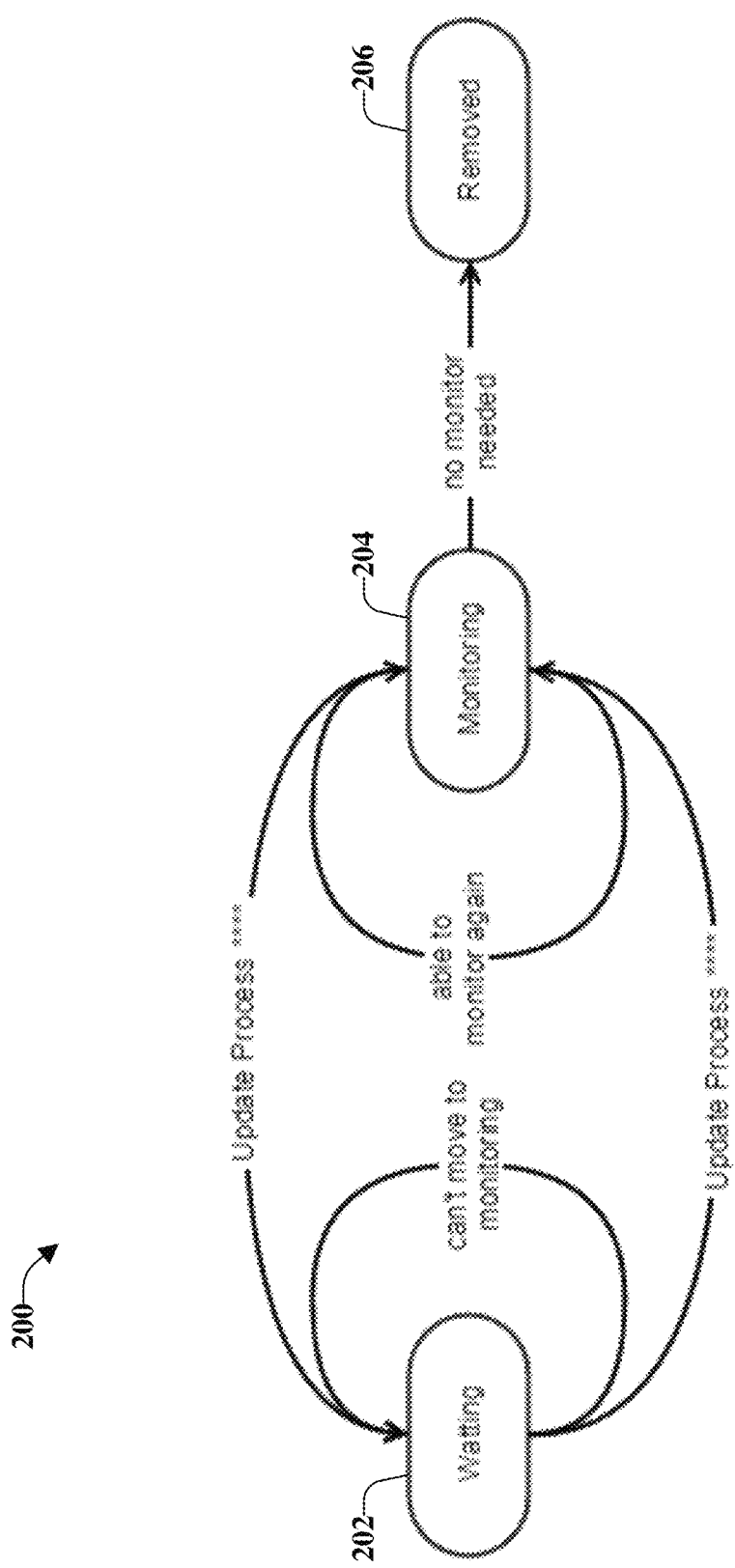
FIG. 2 illustrates an example, non-limiting representation of a finite state machine of a path in accordance with one or more embodiments described herein.

In further detail, FIG. 2 illustrates an example, non-limiting representation of a finite state machine of a path in accordance with one or more embodiments described herein. FIG. 2 illustrates how the Finite State Machine (FSM 200) of the path is transmitted. Every time a path is generated from the monitor process, the path will be in waiting status 202. In the "choose paths process," the paths in the waiting list with high priority can move to monitoring status 204. The low priority paths can stay in the waiting list. Additionally, or alternatively, paths in monitoring status can move to waiting if the paths do not receive a high priority in priority calculation process (merge and update process), or stay in monitoring if a high priority is received. One special case is that, if one path receives a very low priority, that path can be removed 206 from all the paths, to leave spaces for efficiency.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 3:
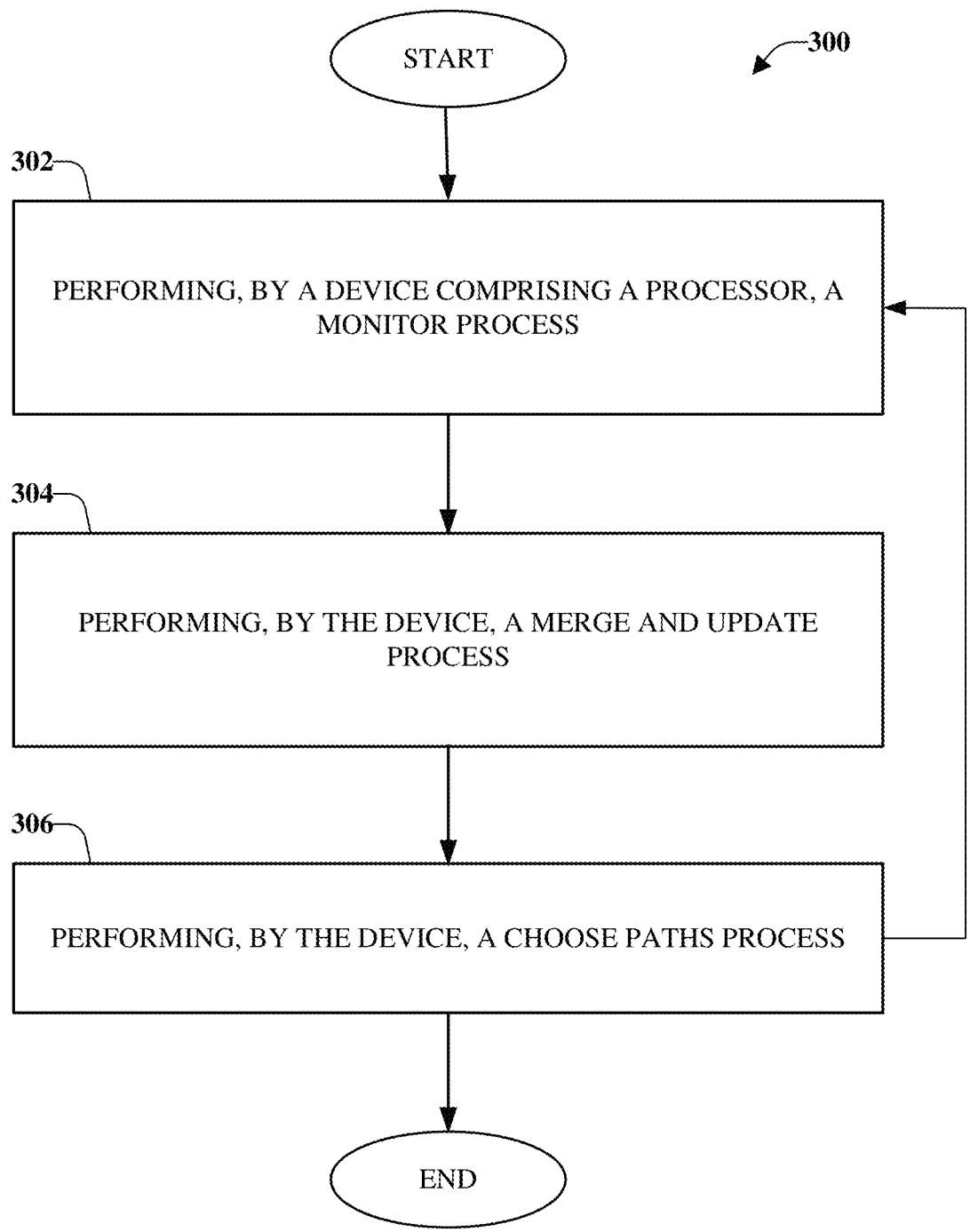
FIG. 3 illustrates a flow diagram of an example, non-limiting, computer-implemented method that facilitates a smart watch list with limited resources in storage systems in accordance with one or more embodiments described herein.

FIG. 3 illustrates a flow diagram of an example, non-limiting, computer-implemented method 300 that facilitates a smart watch list with limited resources in storage systems in accordance with one or more embodiments described herein. Repetitive description of like elements employed in other embodiments described herein is omitted for sake of brevity.

In some implementations, a system comprising a processor can perform the computer-implemented method 300 and/or other methods discussed herein. In other implementations, a device comprising a processor can perform the computer-implemented method 300 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 300 and/or other methods discussed herein. In further implementations, a computer readable storage device comprising executable instructions that, in response to execution, cause a system comprising a processor to perform operations, which can be operations discussed with respect to the computer-implemented method 300 and/or other methods discussed herein.

The computer-implemented method 300 starts, at 302, when a device comprising a processor performs a monitor process (e.g., via the monitor component 102). To perform the monitor process, inputs from "choose paths process" can be obtained and one or more monitor commands can be performed on the inputs to obtain one or more metrics.

In the monitor process, one or more commands can be executed. For example, a "top n" like command can be executed. The top n command can identify the Input/Output I/O consumed paths in different dimensions (e.g., Input/Output Operations per Second (IOPS)). Identification of these consumed paths can help ensure important paths over the entire system are not missed. In an example, a command used to identify the most accessed files and/or directories can be executed.

Another command can be a "dig" like command. This command can identify the detailed workload on a specific path. This command can consume any triggers input, such as paths collected in former monitor processes, or defined paths (including user assigned paths). In an example, a "dig" like command can be used to display statistics for all workloads of specified categories. After the one or more commands execute, a list of paths that need to be considered in the next monitor process can be obtained.

At 304, the device can perform a merge and update process. For example, based on the one or more metrics obtained at 302, a priority function can be utilized to obtain respective priorities of each new path. Further, the respective priorities of the paths can be updated in the waiting and monitoring list. Thereafter, the new generated paths can be merged into the waiting list.

In the merge and update process, the respective priorities of the one or more paths can be determined and updated. A priority function can be defined, which takes both I/O related metrics and the time the path is in waiting status. The I/O related metrics can be IOPS, bytes writes, bytes read, and so on. The time unit can be defined as cycle and the monitor can occur one time in a cycle. Accordingly, the function can be written as:

$$p = m + m*w + m*w^2 + \ldots + m*w^n$$

where p stands for priority, m is the I/O related metric, and w is pre-defined and shows the weight when the wait time grows how the priority should grow, usually $0 \leq w \leq 1$, and n is how many cycles has this path been in waiting status. This function can be written as:

$$p = \frac{1-w^n}{1-w} * m$$

Based on this, the priority for each path can be easily calculated. Upon or after being calculated, the paths can be cleared to make sure every path show only once. If there are two paths that point to the same path but with different priorities, the path with lower priority can be cleared.

A choose paths process can be performed by the device at 306 of the computer-implemented method 300. To perform the paths process, all the paths in priority can be sorted and, considering the limits of the system, the high priority paths to monitor in the next cycle can be determined. In addition, the status of all paths can be updated.

In the choose paths process, all the paths can be sorted by priority. Then, considering the limitations, for example, M paths can be monitored, where M is a positive integer. After the sort, the high priority path can be expanded to their subpaths, while expanding the subpaths will keep the priority of the parent path. Then the first N paths can be moved to monitoring status. The paths with very low priority and that have been in waiting status for a long time, can be removed for efficiency purposes. The other paths can be moved to waiting status, as depicted in FIG. 2. Thereafter, the top N paths can be an input (e.g., the input data 114) for monitor process.

By way of example and not limitation, a storage system comprises folders that are nested as follows:

⊢ A
⊢ B
　⊢ b0
　⊢ b1
　　⊢ public
　　⊢ team

Accordingly, folder B has two subfolders (b0 and b1). Further, subfolder b1 has two subfolders (public and team) under it.

Through utilization of the disclosed aspects, the "top n" command is executed and the following result in Table 1 below is obtained:

TABLE 1

| Path | IOPS |
|------|------|
| A | 200 |
| B | 800 |

A priority can be defined using IOPS as the I/O metric. Upon or after the priority is defined, the priority will be as indicated in Table 2 below.

TABLE 2

| path | IOPS | priority | status |
|---|---|---|---|
| A | 200 | 200 | waiting |
| B | 800 | 800 | waiting |

Further, a limitation can be defined that indicates only two paths can be monitored each time (e.g., at substantially the same time). It is noted that two paths are used as an example only and, in implementation, any number of paths can be determined to be able to be monitored at substantially the same time. Then in the choose paths process, B will expand to B/b0, B/b1, and move to monitoring status, as indicated in Table 3 below.

TABLE 3

| path | IOPS | priority | status |
|---|---|---|---|
| A | 200 | 200 | waiting |
| B/b0 | 800 | 800 | monitoring |
| B/b1 | 800 | 800 | monitoring |

In the next monitor process, the IOPS value can be updated, as indicated in Table 4 below.

TABLE 4

| path | IOPS | priority | status |
|---|---|---|---|
| A | 200 | 200 | waiting |
| B/b0 | 100 | 800 | monitoring |
| B/b1 | 700 | 800 | monitoring |

In the priority function, w is defined to one half (½). Then, after the next merge and update process, the results as indicated in Table 5 below can be obtained.

TABLE 5

| path | IOPS | priority | status |
|---|---|---|---|
| A | 200 | 300 | waiting |
| B/b0 | 100 | 100 | monitoring |
| B/b1 | 700 | 700 | monitoring |

In the next choose paths path, b1 will expand to B/b1/public, B/b1/team, and these two will move to monitoring status, but B/b0 will move to waiting status. This is indicated in Table 6 below.

TABLE 6

| path | IOPS | priority | status |
|---|---|---|---|
| A | 200 | 300 | waiting |
| B/b0 | 100 | 100 | waiting |
| B/b1/public | 700 | 700 | monitoring |
| B/b1/team | 700 | 700 | monitoring |

Then, in next monitor, IOPS can be updated, as indicated in Table 7 below.

TABLE 7

| path | IOPS | priority | status |
|---|---|---|---|
| A | 200 | 300 | waiting |
| B/b0 | 100 | 100 | waiting |
| B/b1/public | 600 | 700 | monitoring |
| B/b1/team | 100 | 700 | monitoring |

In the above example, it has been demonstrated that, first it is only known that the path B is very hot. However, by using the disclosed aspects, it can be determined that B is hot because B/b1/public is very hot. Accordingly, one or more actions can be taken based on this determination.

Figure 4:
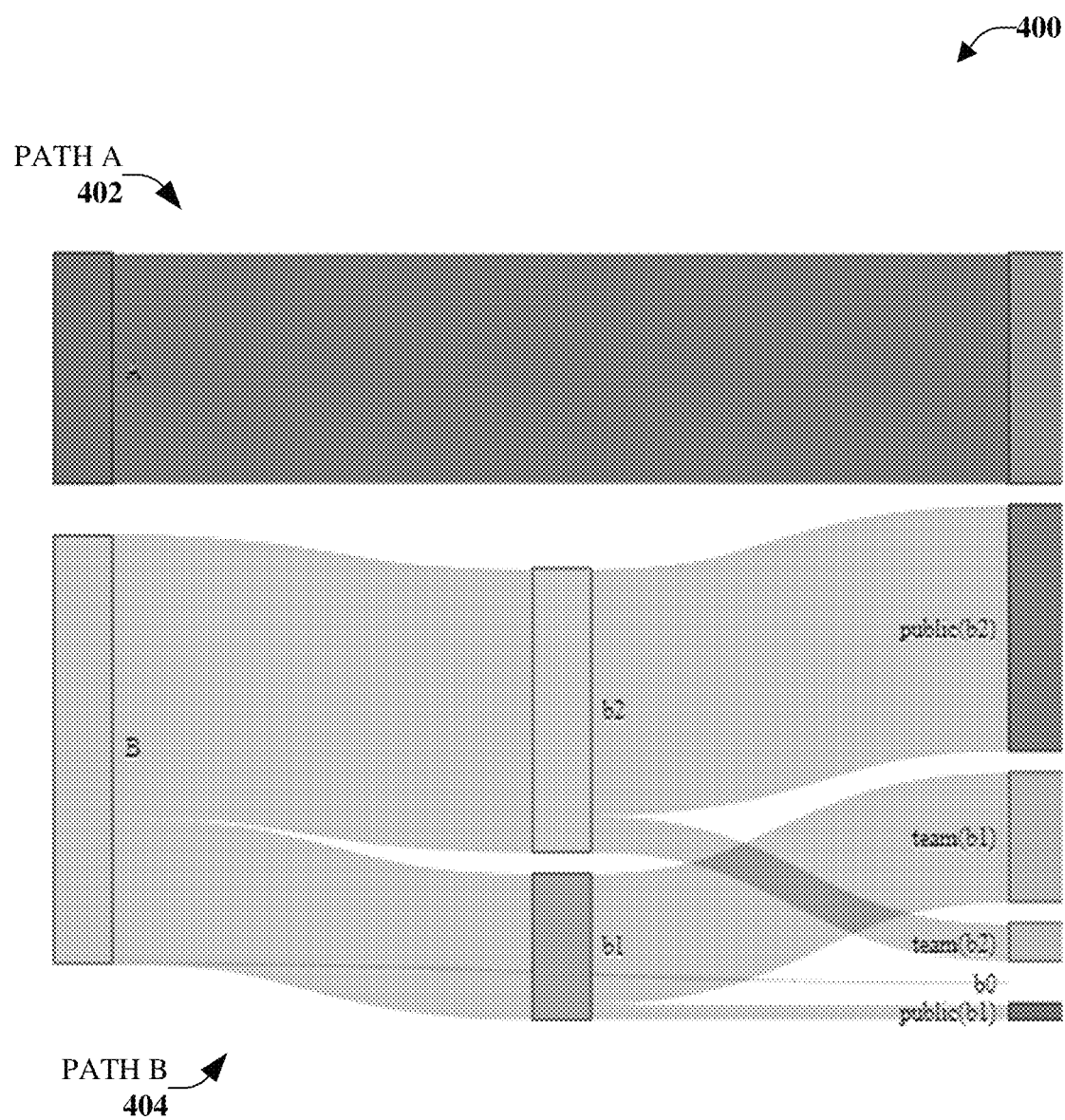
FIG. 4 illustrates an example, non-limiting, representation of an output of Input/Output Operations per Second hotpots in accordance with one or more embodiments described herein.

Based on an experiment, sample project folders with a standard hierarchy were generated on a testing cluster. Further, workloads were designed and injected to the cluster. FIG. 4 illustrates an example, non-limiting, representation 400 of an output of Input/Output Operations per Second hotpots in accordance with one or more embodiments described herein. Illustrated are path A 402 and path B 404.

Figure 5:
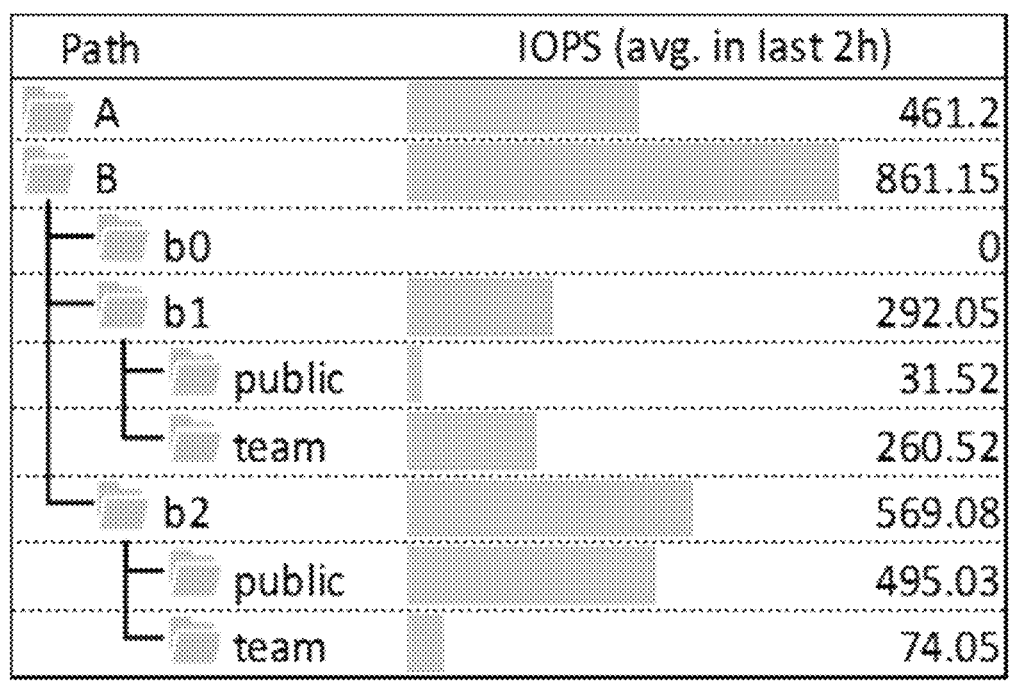
FIG. 5 illustrates an example, non-limiting, representation of Input and/or Output Operations per Second statistics in accordance with one or more embodiments described herein.

FIG. 5 illustrates an example, non-limiting, representation 500 of Input/Output Operations per Second statistics in accordance with one or more embodiments described herein. In this example, the IOPS are averaged over the previous two hours. As indicated, folder b0 under folder B had no activity.

Figure 6:
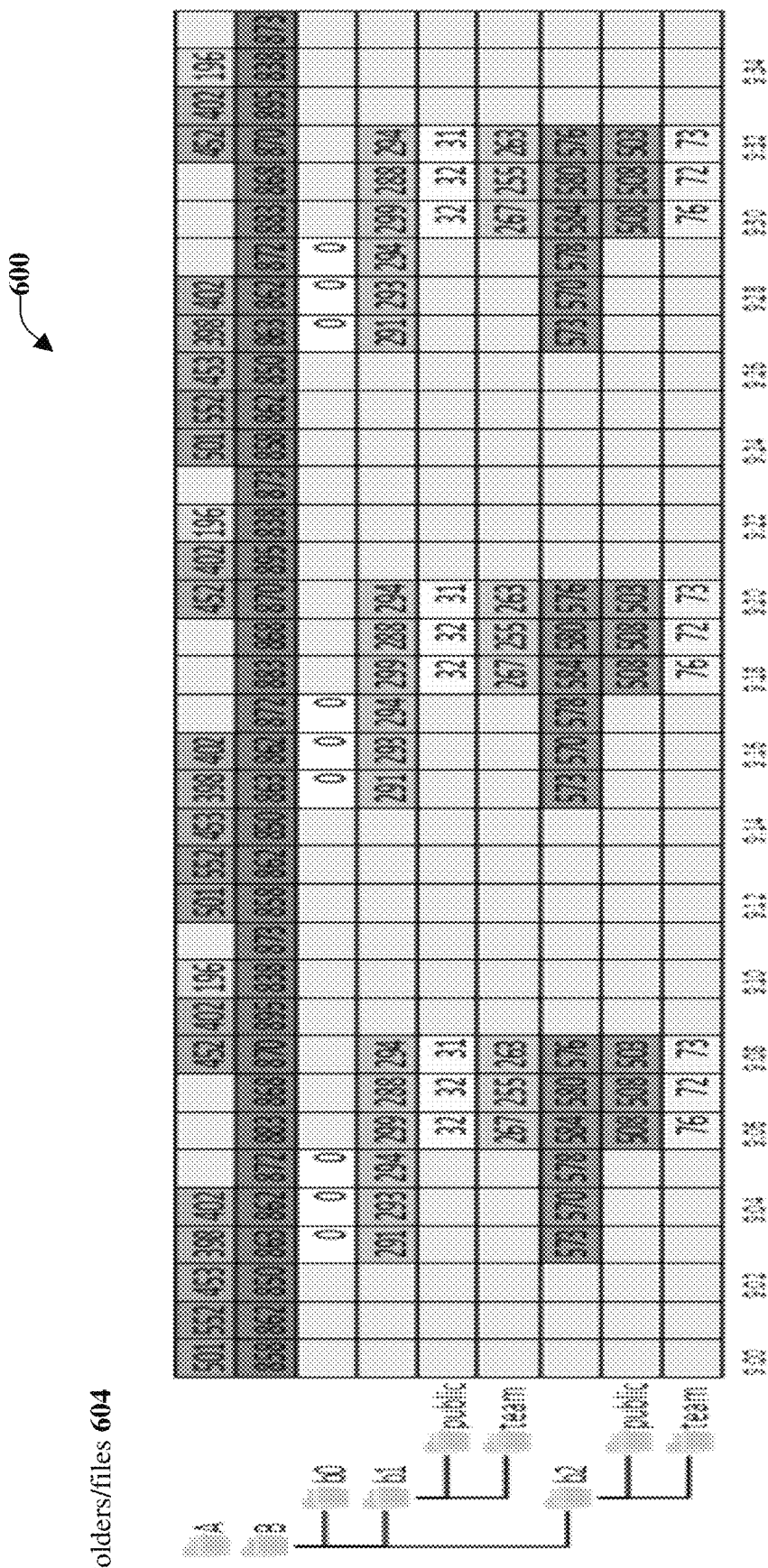
FIG. 6 illustrates an example, non-limiting, graphical representation of Input and/or Output Operations per Second statistics with time series in accordance with one or more embodiments described herein.

FIG. 6 illustrates an example, non-limiting, graphical representation 600 of Input/Output Operations per Second statistics with time series in accordance with one or more embodiments described herein. Time 602 is illustrated on the horizontal axis, a listing of folders and/or files 604 (e.g., the path) under consideration are illustrated on the vertical axis. In this example, the columns represent minute increments. The numbers in the boxes indicate the number of times the file and/or folder was accessed.

Figure 7:
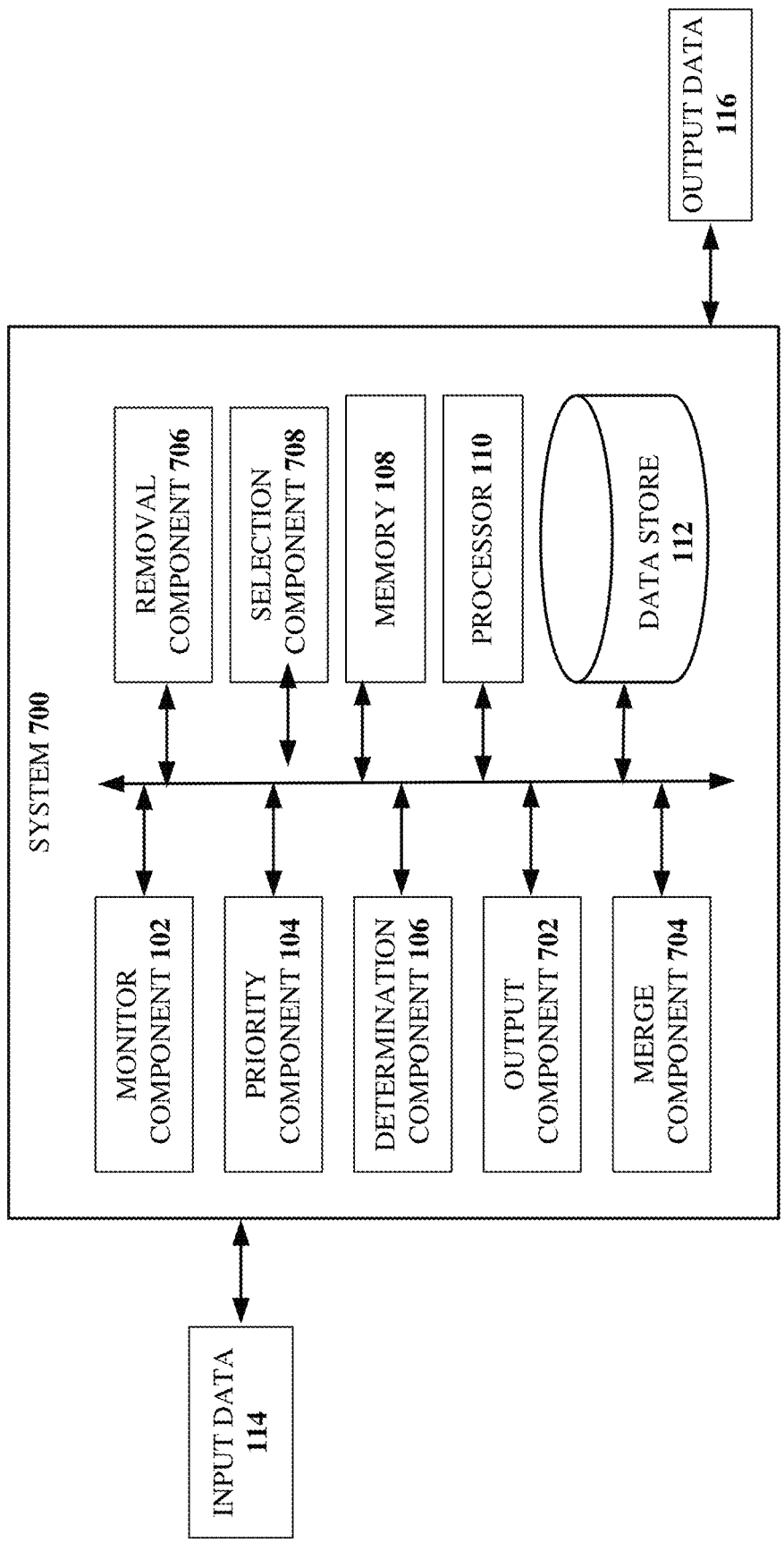
FIG. 7 illustrates an example, non-limiting, system that facilitates the generation of detailed results related to real-time and historic status of a storage system in accordance with one or more embodiments described herein.

FIG. 7 illustrates an example, non-limiting, system 700 that facilitates the generation of detailed results related to real-time and historic status of a storage system in accordance with one or more embodiments described herein. Repetitive description of like elements employed in other embodiments described herein is omitted for sake of brevity. The system 700 can comprise one or more of the components and/or functionality of the system 100 and vice versa.

The priority component 104 can determine a first priority of a first path of a storage system based on a first input (e.g., as input data 114) related to a first wait time associated with the first path and a second input (e.g., as input data 114) related to a first consumption of input resources and output resources by the first path.

In addition, the priority component 104 can determine a second priority of a second path of the storage system based on a third input (e.g., as input data 114) related to a second wait time associated with the second path, and a fourth input (e.g., as input data 114) related to a second consumption of in input resources and output resources by the second path. Accordingly, the priority component 104 can individually, or one-by-one, determine the priority of each of the paths. It is noted that there can be more than two paths, however, the disclosed aspects are discussed with two paths or three paths for purposes of simplicity when describing the various aspects. Further, the identification of first, second, third, fourth, and so on as used herein is for purposes of distinguishing the paths from one another and is not meant to indicate a particular order of the paths.

The determination component 106 can associate respective indications to the paths that specify whether each path should be in a monitor status, a wait status, or should be removed from consideration. For example, the determination component 106 can determine that the first path should be moved to a monitor status and the second path should be moved to a wait status. To make the determination of where each path should be moved (e.g., providing an indication of such determinations) can include determining that the first priority of the first path is a higher priority than the second priority of the second path. In addition, the determination can be based on a limitation of a number of paths that are able to be in the monitor status at a same time.

An output component 702 can output (e.g., render in any perceivable format) respective information indicative of the first priority, the second priority, the monitor status, and the wait status. Examples of such renderings are illustrated in Tables 2-7 above. However, other formats can be utilized to provide the information.

A merge component 704 can determine two or more paths are similar (or the same) and can be merged. For example, the priority component 104 can determine third priority of a third path of the storage system based on a fifth input (e.g., as input data 114) related to a third wait time associated with the third path and a sixth input (e.g., as input data 114) related to a third consumption of input resources and output resources by the third path. Further, the merge component 704 can determine the third path and the first path (or the second path, or another path, or more than one other path) comprise a same name. Based on this, the merge component 704 can merge the third path into the first path (e.g., to make a single path). In the case of more than two paths having a same name, the three or more paths can be merged to make a single path.

In another example, the third path (or the first path, the second path, or another path) is determined to have a third priority that does not satisfy a defined threshold value (e.g., a low priority threshold). In this case, a removal component 706 can remove the third path (and/or other paths) from consideration during the monitor status or monitor process based on a second determination that the third priority does not satisfy the defined threshold value. Accordingly, the third path (or other path) is not moved into the monitor status nor the wait status. Further, the third path is not fed back as an input (e.g., as the input data 114) for a subsequent monitoring determination.

According to some implementations, prior to the priority component 104 determining the first priority and the second priority, a selection component 708 can select the first path and the second path from the storage system based on identification of first paths of the storage system that are consuming more resources than an amount of resources consumed by second paths of the storage system. For example, the selection component 708 can select the one or more paths based on a top n command executed by the monitor component 102. According to some implementations, the selection component 708 can select the one or more paths based on a request received (e.g., as input data 114) to include one or more paths in the monitoring process.

As indicated a previous priority level and monitor process status (e.g., actively being monitored, in a wait state, and so on) can be used as inputs (e.g., the input data 114) for a subsequent monitor process determination. Accordingly, the priority component 104 can determine another priority of the first path based on an input (e.g., the input data 114) related to an updated wait time associated with the first path, and another input (e.g., the input data 114) related to an updated consumption of input resources and/or output resources by the first path. In addition, the priority component 104 can determine another priority of the second path based on an input (e.g., the input data 114) related to an updated wait time associated with the second path, and an input (e.g., the input data 114) related to and consumption of input resources and output resources by the second path.

The determination component 106 can determine, for example, that the second path should be moved to the monitor status and the first path should be moved to the wait status based on a second determination that the updated priority of the second path is a higher priority than the updated priority of the first path and based on the limitation of the number of paths that are able to be in the monitor status at the same time.

The output component 702 can output respective second information indicative of the updated priority of the first path, the updated priority of the second path, the monitor status, and the wait status. Further, the previous information output can be retained as historical data (e.g., in the at least one data store 112).

Figure 8:
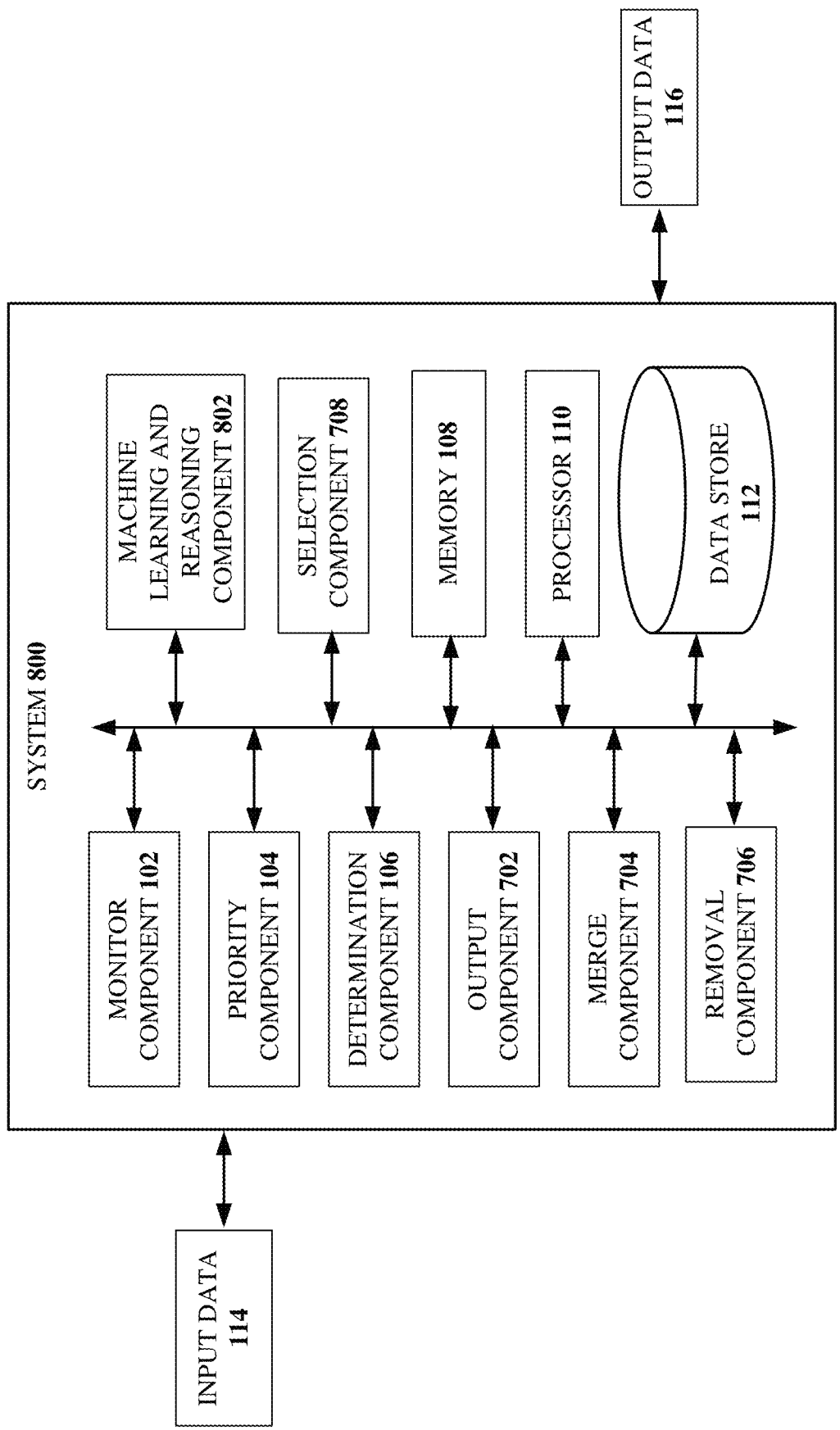
FIG. 8 illustrates an example, non-limiting, system that employs automated learning to facilitate one or more of the disclosed aspects in accordance with one or more embodiments described herein.

FIG. 8 illustrates an example, non-limiting, system 800 that employs automated learning to facilitate one or more of the disclosed aspects in accordance with one or more embodiments described herein. Repetitive description of like elements employed in other embodiments described herein is omitted for sake of brevity. The system 800 can comprise one or more of the components and/or functionality of the system 100, the system 700, and vice versa.

As illustrated, the system 800 can comprise a machine learning and reasoning component 802 that can be utilized to automate one or more of the disclosed aspects. The machine learning and reasoning component 802 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 802 can employ principles of probabilistic and decision theoretic inference. Additionally, or alternatively, the machine learning and reasoning component 802 can rely on predictive models constructed using machine learning and/or automated learning procedures. Logic-centric inference can also be employed separately or in conjunction with probabilistic methods.

The machine learning and reasoning component 802 can infer which paths should be monitored. Based on this knowledge, the machine learning and reasoning component 802 can make an inference based on which paths should be moved into a monitor status, which paths should be moved into a waiting status, which paths should be removed from consideration, or combinations thereof.

As used herein, the term "inference" refers generally to the process of reasoning about or inferring states of a storage system, a component, a module, an environment, and/or devices from a set of observations as captured through events, reports, data and/or through other forms of communication. Inference can be employed to identify paths of interest, whether a limit to the paths that can be monitored at a single time has been reached, which paths are to be monitored (up to the limit), which paths should not be monitored at a current time (which can be based on the limit being reached), and which paths should not be monitored at a current time. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with using limited resources to generate and manage a watch list in storage systems) can employ various artificial intelligence-based schemes for carrying out various aspects thereof. For example, a process for determining if one or more paths should be placed on the watch list, and feeding back information related to the monitor and/or wait status can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine when and how outlier files and/or folders should be evaluated and action taken based on the determination. A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing file and/or folder behavior, by receiving intrinsic information, by receiving extrinsic information, and so on). For example, SVMs can be configured through a learning or training phase within a classifier constructor and feature selection module. Thus, a classifier(s) can be used to automatically learn and perform a number of functions, including but not limited to determining, according to a predetermined criterion, when to evaluate a path, how to identify the paths for monitor status, wait status, or removal status, and so forth.

Additionally, or alternatively, an implementation scheme (e.g., a rule, a policy, and so on) can be applied to control and/or regulate when to (or when not to) monitor a particular path. In some implementations, based upon a predefined criterion, the rules-based implementation can automatically monitor one or more paths. In response thereto, the rule-based implementation can automatically interpret and carry out functions associated with a watch list by employing predefined rule(s) and/or programmed rule(s) based upon any desired criteria.

Figure 9:
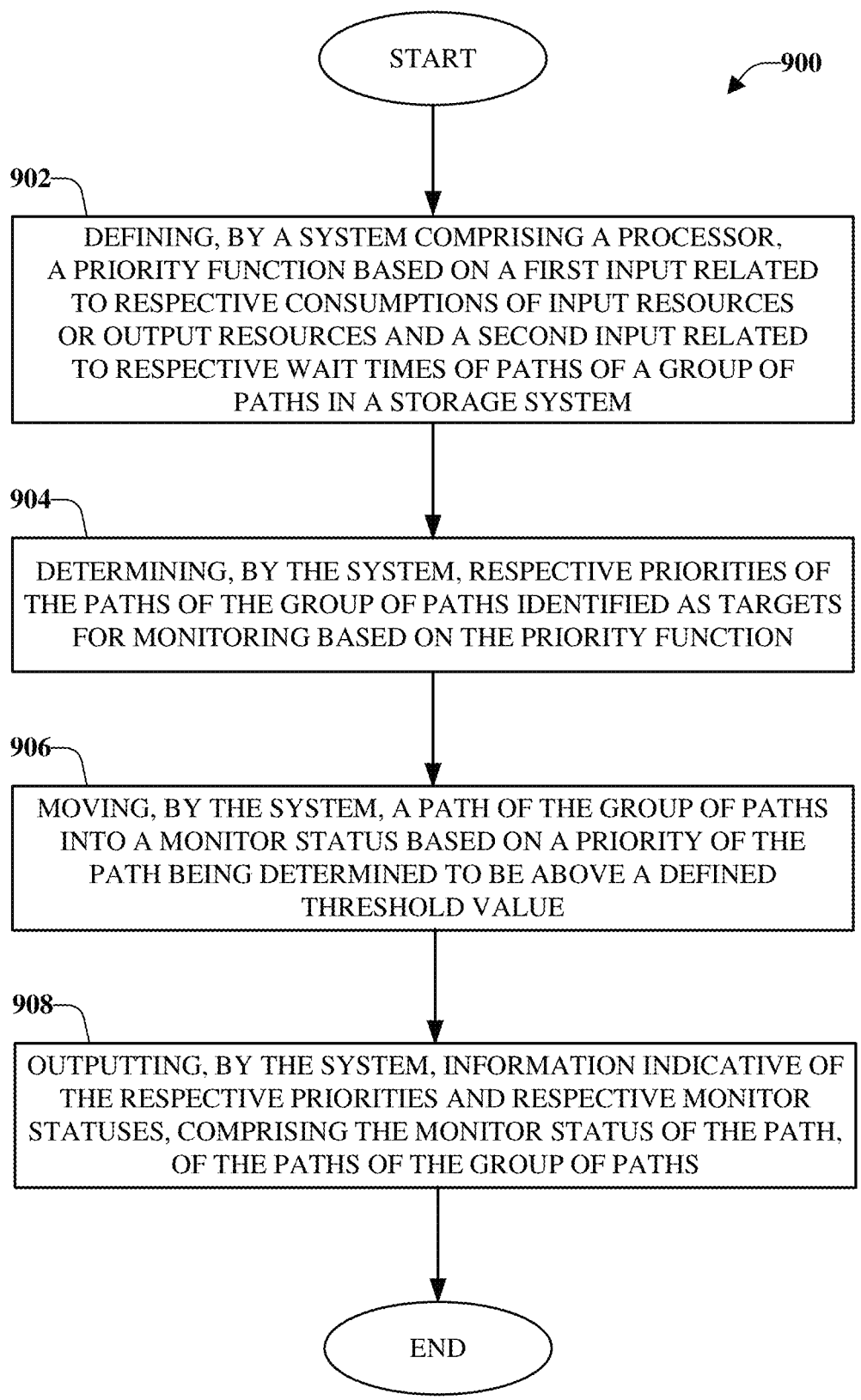
FIG. 9 illustrates a flow diagram of an example, non-limiting, computer-implemented method that facilitates a smart watch list in accordance with one or more embodiments described herein.

FIG. 9 illustrates a flow diagram of an example, non-limiting, computer-implemented method 900 that facilitates a smart watch list in accordance with one or more embodiments described herein. Repetitive description of like elements employed in other embodiments described herein is omitted for sake of brevity.

In some implementations, a system comprising a processor can perform the computer-implemented method 900 and/or other methods discussed herein. In other implementations, a device comprising a processor can perform the computer-implemented method 900 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 900 and/or other methods discussed herein. In further implementations, a computer readable storage device comprising executable instructions that, in response to execution, cause a system comprising a processor to perform operations, which can be operations discussed with respect to the computer-implemented method 900 and/or other methods discussed herein.

At 902 of the computer-implemented method 900, a system comprising a processor can define a priority function based on a first input related to respective consumptions of input resources or output resources and a second input related to respective wait times of paths of a group of paths in a storage system.

Further, at 904, the system can determine respective priorities of the paths of the group of paths identified as targets for monitoring based on the priority function. In accordance with some implementations, a priority of a path increases based on an increase in a wait time and/or an increase in a consumption of input resources and/or output resources. Accordingly, an increase in priority can be directly proportional to an increased waiting time and/or an increased consumption level.

At least one path of the group of paths (e.g., a first path) can be moved into a monitor status, at 906, based on a priority of the path (e.g., a first priority) being determined to be above a defined threshold value (e.g., a first defined threshold value). To "move" the path can mean to mark or otherwise designate the path (or information indicative of the path) as being a path that should be monitored. In some implementations, the path can be indicated as being in a wait status. Alternatively, the path can be indicated as being removed from a monitor process. For example, metadata associated with information indicative of a path can be updated to include information related to a current priority, historical priorities, current monitor status (e.g., currently being monitored, currently in a wait status, being removed from consideration in a monitor process), and/or historical monitor statuses.

According to some implementations, another path (e.g., a second path, a subsequent path) can be determined to have a priority (e.g., a second priority, a subsequent priority) determined to be lower than the first defined threshold value and at or above a second defined threshold value. Further to these implementations, an indication can be associated with the second path to identify the second path as being in a waiting status. The waiting status indicates an amount of time the second path has waited before being monitored. Continuing the above example, it can be determined that a third path has a third priority that is below the second defined threshold value. Further to this implementation, the third path can be removed from the group of paths (e.g., the group of paths under consideration).

According to some implementations, all paths of a storage system could be in a watch status or a wait status, depending on the available system resources. However, in other implementations, a first subset of paths could be in a watch status, a second subset of paths could be in a wait status, and a third subset of paths could be removed from consideration for a watch list as discussed herein.

At 908 of the computer-implemented method 900, the system can output information indicative of the respective priorities and respective monitor statuses, comprising the monitor status of the path, of the paths of the group of paths (e.g., via the output component 702). The output can be in any perceivable format. Information related to the other paths could also be output.

Figure 10:
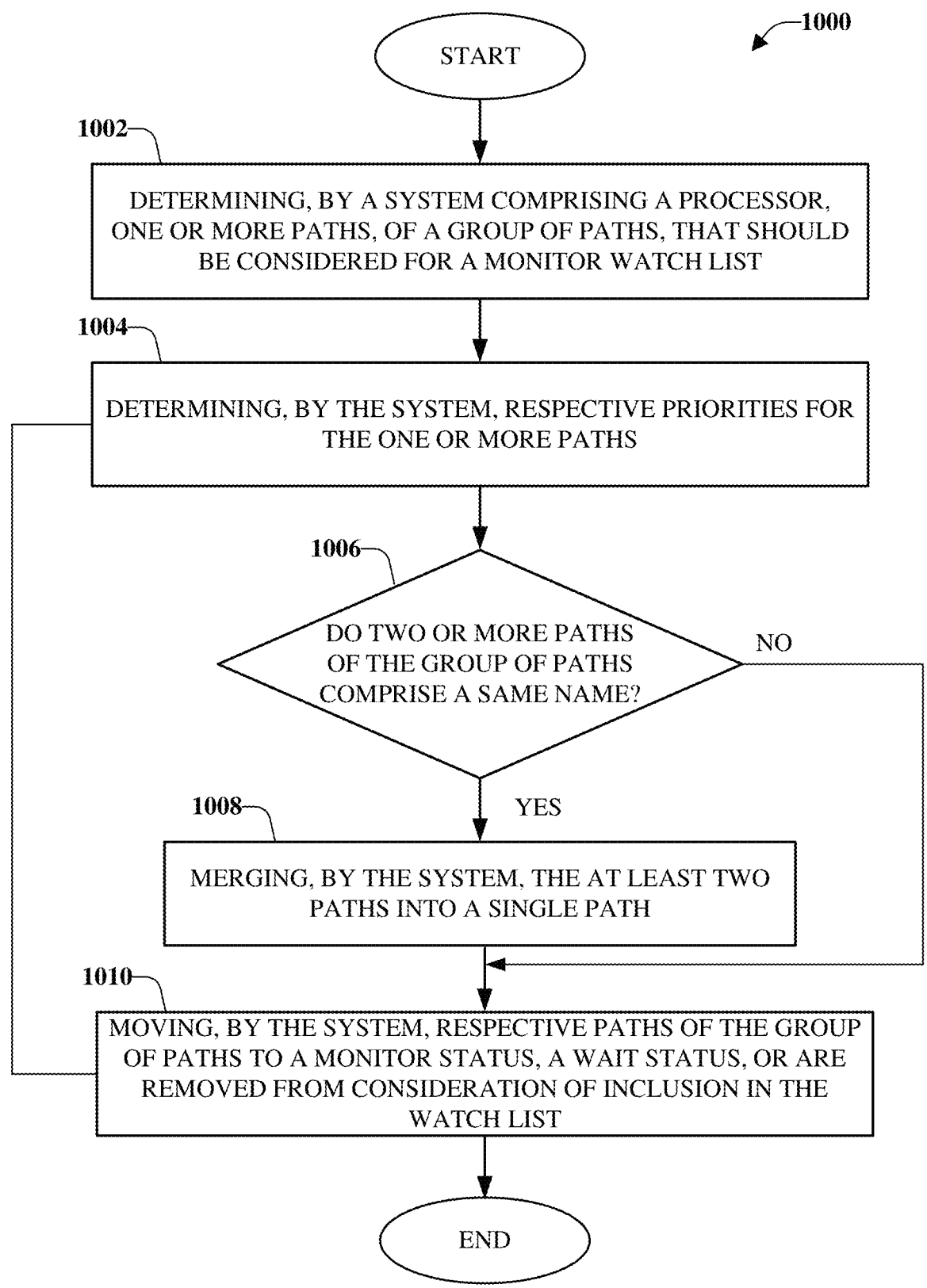
FIG. 10 illustrates a flow diagram of an example, non-limiting, computer-implemented method that identifies one or more paths of a storage system to be monitored and selectively performs monitoring on the identified paths in accordance with one or more embodiments described herein.

FIG. 10 illustrates a flow diagram of an example, non-limiting, computer-implemented method 1000 that identifies one or more paths of a storage system to be monitored and selectively performs monitoring on the identified paths in accordance with one or more embodiments described herein. Repetitive description of like elements employed in other embodiments described herein is omitted for sake of brevity.

In some implementations, a system comprising a processor can perform the computer-implemented method 1000 and/or other methods discussed herein. In other implementations, a device comprising a processor can perform the computer-implemented method 1000 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 1000 and/or other methods discussed herein. In further implementations, a computer readable storage device comprising executable instructions that, in response to execution, cause a system comprising a processor to perform operations, which can be operations discussed with respect to the computer-implemented method 1000 and/or other methods discussed herein.

At 1002 of the computer-implemented method 1000, a system comprising a processor can determine one or more paths (e.g., a group of paths) that should be considered for a monitor watch list. For example, the one or more paths can be identified as targets for monitoring. The one or more paths can be a subset of paths in the storage system.

According to an implementation, the one or more paths can be determined based on execution of a top n command on the storage system. The top n command can identify at least one path from the group of paths that is consuming more resources as compared to the consumption of other paths, excluding the one path, of the group of paths, where n is a positive integer.

In an alternative, or additional, implementation, the one or more paths can be determined based on a received request to monitor one or more paths of the storage system. The selection of the one or more paths can be based, at least in part, on the request. For example, the request can be received from one or more entities. In some implementations, the request can be received based on the request, the top-n command, or other considerations. As utilized herein an entity can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

At 1004, the system can determine respective priorities for the one or more paths. For example, the respective priorities can be a first priority for a first path, a second priority for a second path, a third priority for a third path, and so on. Further, the respective priorities can be determined based on a priority function determined based on a first input related to respective consumptions of input resources or output resources and a second input related to respective wait times of paths of the paths of the group of paths in the storage system.

Further, at 1006, a determination can be made whether two or more paths of the group of paths comprise a same name. If at least two paths comprise the same name ("YES"), at 1008 of the computer-implemented method 1000, the two (or more paths) are merged into a single path. If there are no paths that comprise the same name ("NO") or after the paths are merged into a single path, at 1010, respective paths of the group of paths are moved to a monitor status, a wait status, or are removed from consideration of inclusion in the watch list. According to some implementations, the paths can be moved based on a limitation on a number of paths that are able to be monitored at a same time. Accordingly, in some cases, one or more paths will be placed on a waiting list (e.g., waiting to be monitored) because there are not enough resources to monitor more than a defined number of paths at a single time.

The output of 1010 can be fed back into the method as an input, at 1004. For example, the list of paths being monitored and the paths waiting can be used to determine respective updated priorities of the paths. It is to be understood that any number of subsequent priorities can be determined based on using, for at least one input, the respective priorities and respective statuses of a path in the most recent monitor process (e.g., watch list).

Figure 11:
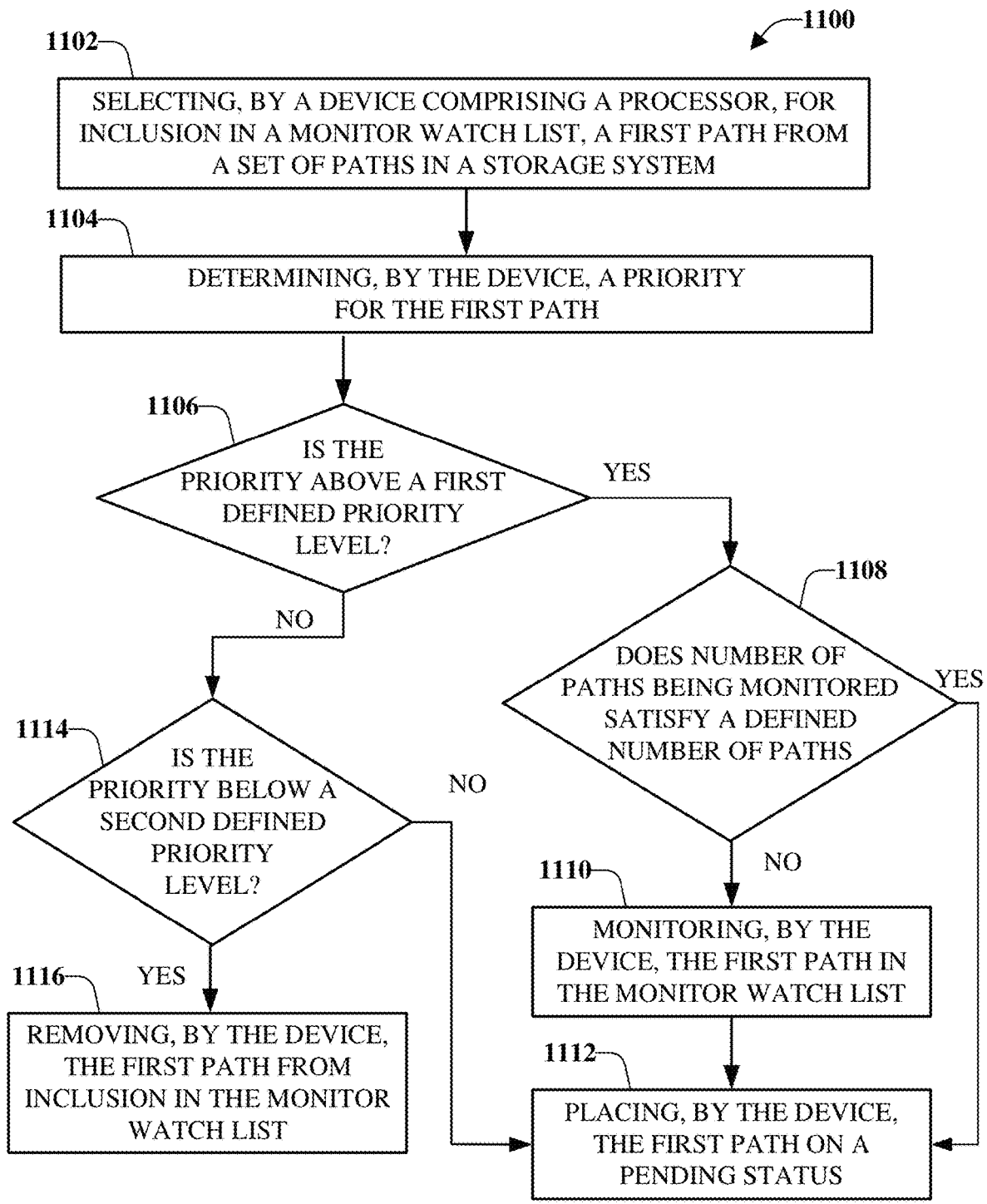
FIG. 11 illustrates a flow diagram of an example, non-limiting, computer-implemented method that continually monitors one or more paths in a storage system in accordance with one or more embodiments described herein.

FIG. 11 illustrates a flow diagram of an example, non-limiting, computer-implemented method 1100 that continually monitors one or more paths in a storage system in accordance with one or more embodiments described herein. Repetitive description of like elements employed in other embodiments described herein is omitted for sake of brevity.

In some implementations, a system comprising a processor can perform the computer-implemented method 1100 and/or other methods discussed herein. In other implementations, a device comprising a processor can perform the computer-implemented method 1100 and/or other methods discussed herein. For example, the device can be a node device in other implementations, a machine-readable storage medium, can comprise executable instructions that, when executed by a processor, facilitate performance of operations, which can be the operations discussed with respect to the computer-implemented method 1100 and/or other methods discussed herein. In further implementations, a computer readable storage device comprising executable instructions that, in response to execution, cause a system comprising a processor to perform operations, which can be operations discussed with respect to the computer-implemented method 1100 and/or other methods discussed herein.

At 1102 of the computer-implemented method 1100, a device comprising a processor can select, for inclusion in a monitor watch list, a first path from a set of paths in a storage system. According to some implementations, more than one path can be selected. One or more paths can be selected based on an explicit request to monitor the path(s), based on a top n command, or based on other criteria.

A first priority for the first path can be determined at 1104. Other priorities for other paths can also be determined. The first priority, and the other priorities, can be determined based on one or more inputs, including an input received via a feedback loop as discussed herein.

Upon or after the first priority is determined, a determination can be made, at 1106, whether the first priority is above a first defined priority level. If the first priority is above the first defined priority level ("YES"), at 1108, a determination is made whether a number of paths being monitored satisfies a defined number of paths. If the defined number of paths is not satisfied (e.g., more paths can be monitored) ("NO"), at 1110, the first path is monitored in the monitor watch list. Alternatively, if the defined number of paths is satisfied ("YES"), no further paths can be monitored and the first path is placed on a pending status (e.g., a waiting list), at 1112.

If it is determined at 1106 that the first priority is below the first defined priority level ("NO"), at 1112, a determination can be made whether the first priority level is below a second defined priority level. The second defined priority level can be selected as a level that is so low that the path does not need to be monitored. If the determination is that the first priority level is not below the second defined priority level ("NO"), the computer-implemented method 1100 continues, at 1112 and the first path is placed in the pending status.

However, if the first priority level is below the second defined priority level ("YES"), at 1114 of the computer-implemented method 1100, the first path is removed from inclusion in the monitor watch list.

It is noted that after the first path is placed in the monitor status, at 1110, or placed in the pending status, at 1112, information related to these actions can be fed back as input to determine another priority of the first path, as discussed herein. Accordingly, at 1104 a second (or subsequent) priority can be determined for the first path. Thereafter, another determination can be made whether the second (or subsequent) priority is above the first defined priority level. If above the first defined priority level, at 1106, another determination can be made, at 1108, whether the number of paths satisfies the defined number of paths. If not, the first path can be monitored, or if already being monitored can continue to be monitored at 1112.

If the second (or subsequent) priority is below the first priority level, another determination can be made at 1112 whether the second (or subsequent) priority is below a second defined priority level. If not, the first place can be placed in the pending status or, if already in the pending status, the first path can be retained in the pending status. If the second (or subsequent) priority is below the pending status, the first path can be removed from including in the monitor watch list, at 1116.

As used herein, the term "storage device," "first storage device," "storage cluster nodes," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 12:
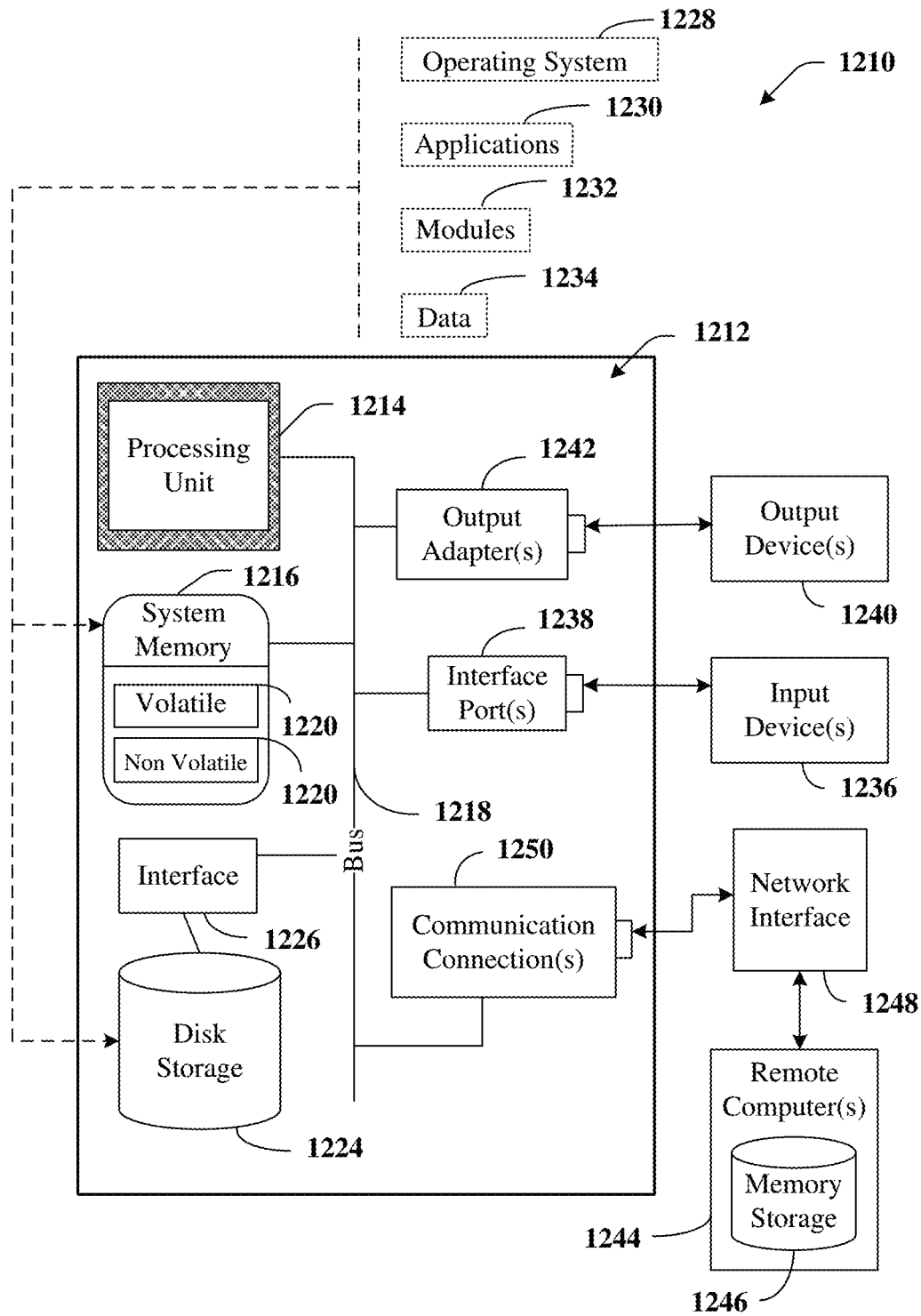
FIG. 12 illustrates an example, non-limiting, computing environment in which one or more embodiments described herein can be facilitated.

In order to provide a context for the various aspects of the disclosed subject matter, FIG. 12 as well as the following discussion are intended to provide a brief, general description of a suitable environment in which the various aspects of the disclosed subject matter can be implemented.

With reference to FIG. 12, an example environment 1210 for implementing various aspects of the aforementioned subject matter comprises a computer 1212. The computer 1212 comprises a processing unit 1214, a system memory 1216, and a system bus 1218. The system bus 1218 couples system components including, but not limited to, the system memory 1216 to the processing unit 1214. The processing unit 1214 can be any of various available processors. Multi-core microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 comprises volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can comprise read only memory (ROM), programmable ROM (PROM), electrically programmable ROM (EPROM), electrically erasable PROM (EEPROM), or flash memory.

Volatile memory 1220 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also comprises removable/non-removable, volatile/non-volatile computer storage media. FIG. 12 illustrates, for example a disk storage 1224. Disk storage 1224 comprises, but is not limited to, devices like a magnetic disk drive, floppy disk drive, tape drive, Jaz drive, Zip drive, LS-100 drive, flash memory card, or memory stick. In addition, disk storage 1224 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software comprises an operating system 1228. Operating system 1228, which can be stored on disk storage 1224, acts to control and allocate resources of the computer 1212. System applications 1230 take advantage of the management of resources by operating system 1228 through program modules 1232 and program data 1234 stored either in system memory 1216 or on disk storage 1224. It is to be appreciated that one or more embodiments of the subject disclosure can be implemented with various operating systems or combinations of operating systems.

A user enters commands or information into the computer 1212 through input device(s) 1236. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 comprise, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapters 1242 are provided to illustrate that there are some output devices 1240 like monitors, speakers, and printers, among other output devices 1240, which require special adapters. The output adapters 1242 comprise, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically comprises many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the system bus 1218. While communication connection 1250 is shown for illustrative clarity inside computer 1212, it can also be external to computer 1212. The hardware/software necessary for connection to the network interface 1248 comprises, for exemplary purposes only, internal and external technologies such as, modems including regular telephone grade modems, cable modems and DSL modems, ISDN adapters, and Ethernet cards.

Figure 13:
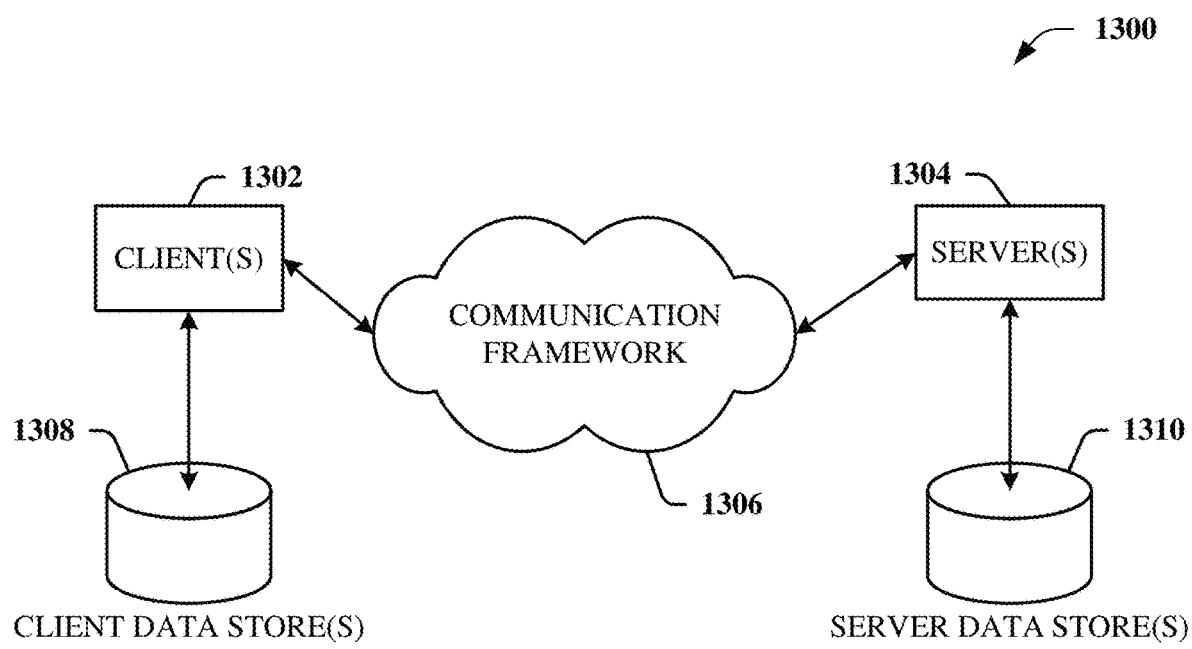
FIG. 13 illustrates an example, non-limiting, networking environment in which one or more embodiments described herein can be facilitated.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A method, comprising:
defining, by a system comprising a processor, a priority function based on a first input related to respective consumptions of input resources or output resources and a second input related to respective wait times of paths of a group of paths in a storage system;

determining, by the system, respective priorities of the paths of the group of paths identified as targets for monitoring based on the priority function;

moving, by the system, a path of the group of paths into a monitor status based on a priority of the path being determined to be above a defined threshold value; and outputting, by the system, information indicative of the respective priorities and respective monitor statuses, comprising the monitor status of the path, of the paths of the group of paths.

2. The method of claim 1, wherein the path is a first path, wherein the priority is a first priority, wherein the defined threshold value is a first defined threshold value, and wherein the method further comprises:

determining, by the system, a second path that has a second priority determined to be lower than the first defined threshold value and at, or above, a second defined threshold value; and associating, by the system, an indication with the second path, wherein the indication identifies the second path as being in a waiting status, wherein the waiting status indicates an amount of time the second path has waited before being monitored.

3. The method of claim 2, further comprising:

determining, by the system, a third path that has a third priority determined to be below the second defined threshold value; and removing, by the system, the third path from the group of paths.

4. The method of claim 1, further comprising:

prior to the moving the path into the monitor status, determining, by the system, at least two paths of the group of paths comprise a same name; and merging, by the system, the at least two paths into a single path.

5. The method of claim 1, further comprising:

prior to the determining the respective priorities, selecting, by the system, the group of paths as a subset of a plurality of paths in the storage system.

6. The method of claim 5, wherein the selecting the group of paths comprises executing, by the system, a top n command on the storage system, wherein the top n command identifies one path from the group of paths that is consuming more resources as compared to consumption of other paths of the group of paths, excluding the one path, and wherein n is a positive integer.

7. The method of claim 1, wherein the selecting the group of paths comprises:

prior to the determining the respective priorities, receiving, by the system, a request to monitor one or more paths of the storage system; and selecting, by the system, the group of paths as a subset of a plurality of paths in the storage system based, at least in part, on the request.

8. The method of claim 1, wherein the determining the respective priorities comprises determining respective first priorities, and wherein the method further comprises:

generating, by the system, a list of paths being monitored, including the path;

using, by the system, the list of paths as a third input related to the paths to be monitored, and determining, by the system, respective second priorities of the paths.

9. The method of claim 1, wherein the determining respective priorities of the paths of the group of paths comprises determining the respective priorities of the paths based on a third input that comprises a limitation on a number of paths that are able to be monitored at a same time.

10. The method of claim 1, wherein the priority of the path increases based on a first increase in a wait time or a second increase in a consumption of input resources or output resources.

11. A system, comprising:

a processor; and a memory that stores executable instructions that, when executed by the processor, facilitate performance of operations, comprising:

determining a first priority of a first path of a storage system based on a first input related to a first wait time associated with the first path, and a second input related to a first consumption of input resources and output resources by the first path, and a second priority of a second path of the storage system based on a third input related to a second wait time associated with the second path, and a fourth input related to a second consumption of input resources and output resources by the second path;

moving the first path to a monitor status and the second path to a wait status based on a determination that the first priority of the first path is a higher priority than the second priority of the second path and based on a limitation of a number of paths that are able to be in the monitor status at a same time; and outputting respective information indicative of the first priority, the second priority, the monitor status, and the wait status.

12. The system of claim 11, wherein the determination is a first determination, and wherein the operations further comprise:

determining a third priority of a third path of the storage system based on a fifth input related to a third wait time associated with the third path and a sixth input related to a third consumption of input resources and output resources by the third path; and determining the third path and the first path comprise a same name; and merging the third path into the first path.

13. The system of claim 11, wherein the operations further comprise:

determining a third priority of a third path of the storage system based on a fifth input related to a third wait time associated with the third path and a sixth input related to a third consumption of input resources and output resources by the third path; and removing the third path from consideration during the monitor status based on a second determination that the third priority does not satisfy a defined threshold value.

14. The system of claim 11, wherein the operations further comprise:

prior to the determining the first priority and the second priority, selecting the first path and the second path from the storage system based on identification of first paths of the storage system that are consuming more resources than an amount of resources consumed by second paths of the storage system.

15. The system of claim 11, wherein the determination is a first determination, wherein the respective information is respective first information, and wherein the operations further comprise:

determining a third priority of the first path based on a fifth input related to a third wait time associated with the first path, and a sixth input related to a third consumption of input resources and output resources by the first path;

determining a fourth priority of the second path based on a seventh input related to a fourth wait time associated with the second path, and an eighth input related to a fourth consumption of input resources and output resources by the second path;

moving the second path to the monitor status and the first path to the wait status based on a second determination that the fourth priority of the second path is a higher priority than the third priority of the first path and based on the limitation of the number of paths that are able to be in the monitor status at the same time; and outputting respective second information indicative of the third priority, the fourth priority, the monitor status, and the wait status.

16. The system of claim 11, wherein the operations further comprise:
prior to the determining the first priority of the first path and the second priority of the second path, receiving a request to include at least one of the first path and the second path in a monitoring process.

17. A machine-readable storage medium, comprising executable instructions that, when executed by a processor, facilitate performance of operations, comprising:
selecting, for inclusion in a monitor watch list, a first path from a set of paths in a storage system;
determining a first priority for the first path; and
performing at least one of:
monitoring the first path in the monitor watch list based on the first priority being above a first defined priority level and based on a first determination that a number of paths being monitored does not satisfy a defined number of paths,
placing the first path in a pending status based on a second determination that the number of paths being monitored satisfies the defined number of paths, or
removing the first path from inclusion in the monitor watch list based on the first priority being below a second defined priority level, wherein the first defined priority level is a higher priority than the second defined priority level.

18. The machine-readable storage medium of claim 17, wherein the operations further comprise:
determining a second priority for the first path after a defined interval; and
performing at least one of:
monitoring, or continuing to monitor, the first path based on the second priority being above the first defined priority level and based on a third determination that the number of paths being monitored does not satisfy the defined number of paths;
placing, or retaining, the first path in the pending status based on a fourth determination that the number of paths being monitored satisfies the defined number of paths, or
removing the first path from inclusion in the monitor watch list based on the second priority being below the second defined priority level.

19. The machine-readable storage medium of claim 17, wherein the selecting the first path comprises receiving a request that the first path be included in the monitor watch list.

20. The machine-readable storage medium of claim 17, wherein the selecting the first path comprises identifying the first path as consuming more resources as compared to other paths in the set of paths.

* * * * *